United States Patent Office 3,299,116
Patented Jan. 17, 1967

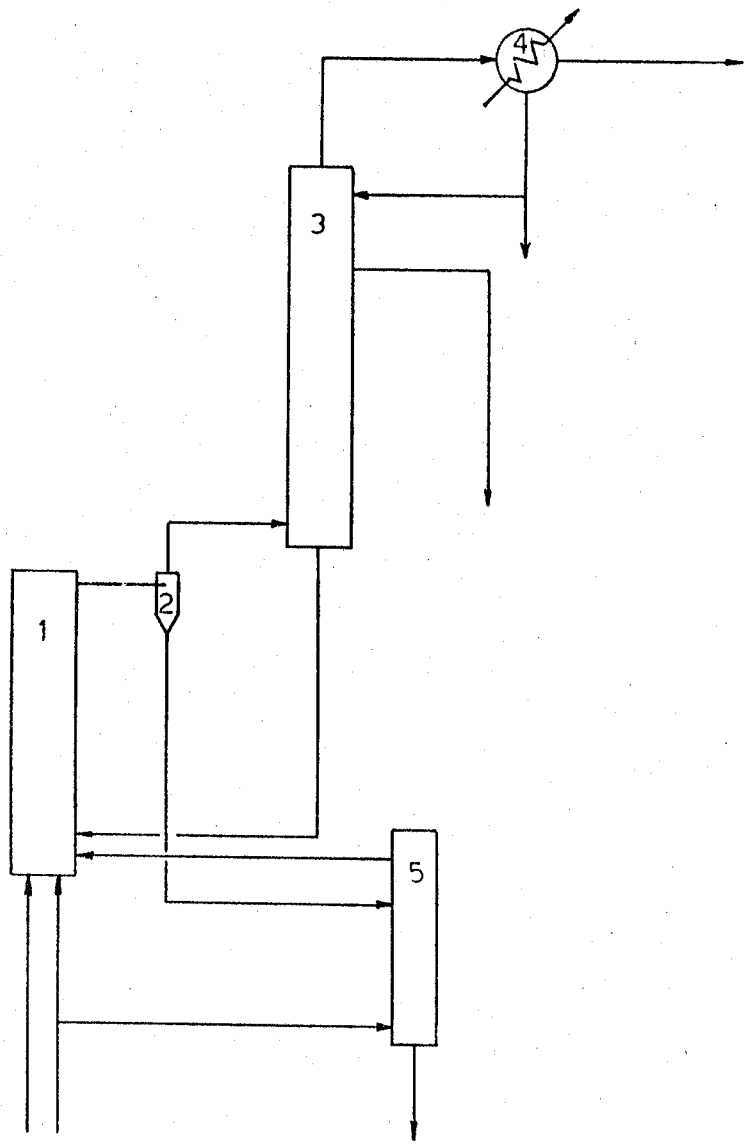

3,299,116
CONTINUOUS PROCESS FOR PRODUCING ADIPONITRILE
Roberto Romani and Mario Ferri, Novara, Italy, assignors to Società Rhodiatoce S.p.A., Milan, Italy
Filed Feb. 10, 1964, Ser. No. 343,879
Claims priority, application Italy, Feb. 20, 1963, 3,533/63
7 Claims. (Cl. 260—465.2)

Our invention relates to an improved process for continuous manufacture of adiponitrile from adipic acid and ammonia, in the presence of a dehydration catalyst.

The methods usually employed for manufacturing adiponitrile from adipic acid may be divided into two groups; those wherein the conversion is carried out in vapor phase and those wherein the conversion is carried out in liquid phase.

Vapor phase processes are characterized in that adipic acid vapors are sent, together with an excess of ammonia, onto a catalyst bed. Vaporization of adipic acid and the high temperatures required for carrying out the process cause decomposition of a considerable part of the acid, and furthermore, the catalysts are rather quickly deactivated.

Liquid phase processes are characterized in that gaseous ammonia is reacted with molten adipic acid containing phosphoric acid or derivatives thereof as catalysts. These processes are generally carried out batchwise with yields of about 85% technically pure adiponitrile.

According to French Patent 866,922, it is also possible to prepare liquid phase adiponitrile on a continuous basis, by using several reactors in series. However, when attempting to carry out the process continuously, it is actually found that the yields are low due to by-product formation during the high residence (reaction) time. If, with a view to improving the yield, the process is operated at lower reaction times, such as a few minutes or seconds, the difficulties which arise nullify the advantages of a continuous process.

It has been found that the conditions necessary to obtain good conversions employing short reaction times, namely high temperatures and ammonia in great excess, cause vaporization of a high portion of reaction products. With such conditions, both the catalyst and/or tarry by-products tend to foul the reactor walls, hindering the heat transfer to such extent that, after a short time, the run has to be stopped to clean the apparatus. The fouling is accompanied by corrosion of the exchange surfaces, making it impossible to employ the commonly used 18/8 and 18/8/2 stainless steels, making it necessary to use special materials.

An object of our present invention is to furnish an improved process for manufacturing adiponitrile in liquid phase, by reacting adipic acid and gaseous ammonia in excess, in the presence of phosphoric acid or its derivatives as catalysts. The process has the advantages of a really continuous cycle with particularly high yields, generally between 88 to 93%.

Another object of our invention is to provide a process which yields a high proportion of good purity product directly. Other objects of this invention will become evident through the subsequent disclosure of our invention.

According to our invention, we synthesize in liquid phase adiponitrile from adipic acid and excess ammonia in a continuous cycle for long periods of time with high yields by reacting adipic acid and ammonia under suitable conditions, in the presence of a suitable diluent.

The diluent must meet the following requirements: stabile under the reaction conditions; it should not contaminate the final product or at least easily separate from it, act as a solvent for the catalyst and, at least within certain limits, for the starting and final reaction products.

We obtain very good results using as the diluent, one of the reaction products of adipic acid and ammonia such as adiponitrile, omega-cyanovaleramide, adipamide and the like. The diluents, therefore, comprise adiponitrile, mixtures of adiponitrile with one or more intermediate products of the reaction, intermediate products of the reactions, and the like. It is not necessary for purposes of our invention that these products be completely pure. They may also contain tars, catalyst and other less volatile by-products.

The use of diluent in suitable amount hinders, or at least minimizes the fouling of reactor walls by the tars and catalysts. Under these conditions, corrosion also disappears, and therefore, commonly used stainless steels may then be employed. Furthermore, the use of diluent makes possible the maintenance of a uniform temperature during the initial contacting phase of the reactants. Other advantages will appear from further reading of our disclosure.

The diluent can be introduced directly into the reactor or can be premixed with adipic acid. The most suitable amount depends on the reaction working conditions, more particularly on the reaction temperature and excess of ammonia.

Generally, it is preferable to use an amount of diluent corresponding to 1–8 times the weight of reacted adipic acid. It is not advisable to use less than 0.3 whereas more than 8 does not lead to perceptible advantages.

The process according to our invention comprises essentially, causing adipic acid, diluent, catalyst and ammonia to pass through a heated reactor, and thereafter separating the resulting products by known methods. The adipic acid can be fed by most any method; generally it is preferable to use it in the molten state or as a solution in the diluent. In order that the reaction may proceed satisfactorily, it is necessary to use an excess of ammonia. The excess is preferably between 5 to 14 mols per mol of adipic acid. The use of a larger excess does not produce perceptible advantages. Phosphoric acid and its salts or derivatives soluble in the reaction medium may be used as catalysts. Such derivatives comprise diammonium phosphate, alkyl phosphates, aryl phosphates and the like. The catalyst may be dissolved in molten adipic acid or in the diluent or may be fed separately.

The amount of catalyst to be fed varies within very wide limits (0.02–2% by weight as $H_3PO_4$ with respect to adipic acid) depending on reaction conditions. Preferably, the amount of catalyst should be less than that which can be dissolved in the liquid phase of the reaction mixture, because an excess fouls the exchange walls. On the other hand, use of an insufficient amount of catalyst gives very low yields and large amounts of by-products are formed. It is advisable, therefore, to use an amount of catalyst as low as possible, preferably not higher than 0.5% by weight as phosphoric acid with respect to adipic acid, but not lower than 0.05%.

The reaction is preferably carried out at atmospheric pressure. However, large variations from these conditions are possible and do not limit the present invention. The temperature range within which the reaction can be carried out is between 240° and 320° C. However, in order to obtain the best yields and highest conversion it is preferable to operate between 260° and 300° C.

According to the method of our invention, the initial contact among the reactants, the diluent and the catalyst, which almost corresponds to the exothermic phase of the reaction, is carried out at temperatures much lower than those of the actual reaction. Generally, this operation is carried out between 220° to 260° C. The use of relatively low initial temperatures and the presence of diluent cause a noticeable reduction of by-product formation.

The process according to the present invention can be carried out by diverse types of apparatus. Thus, for example a heated plate column or a film-exchanger, wherein the flow of ammonia is sent countercurrent to the mixture of adipic acid and diluent may be used. The preferred embodiment of this invention provides for the use of a vertical tubular reactor, for example a tower type, or a bundle of tubes. Ammonia, adipic acid, diluent and catalyst are introduced in the same directional flow into the bottom of the reactor.

In the above-mentioned reactor, in order to obtain highest yields, it is preferable to have a gaseous current flowing into the reactor that hinders the excessive staying time of the liquid. If this current is expressed as flow rate of ammonia, it is not advisable to use less than 50 Nl./h. cm.$^2$ of section of reactor, while best results are obtained with flow rates between 200 and 800 Nl./h. cm.$^2$.

Similarly, the flow rate of adipic acid into the reactor is preferably between 0.1 and 2.0 kg./h. liters of reaction space. The reactor has to be capable of providing the calories necessary for attainment of the process. In this connection, it is important to use a heating medium providing the most uniform temperature such as condensing vapors or liquids under forced circulation. For this purpose, Dowtherm, mineral oils, paraffin, etc., can be suitably used.

From the reaction apparatus, flows a product comprising two phases, one gaseous and the other liquid. The gaseous phase is composed of an excess of ammonia, water formed during the reaction, large amounts of adiponitrile and intermediate products, and a very low percentage of volatile by-products, such as carbon dioxide, cyclopentyliden-2 cyclopentanone. The liquid phase comprises adiponitrile, intermediate products, non-volatile by-products and catalyst.

After the removal of water and ammonia, the product is subjected to a process which separates the adiponitrile, diluent and waste fraction, containing essentially non-volatile by-products and catalyst. For this purpose, it is possible, for example, to subject the product to a rectification at reduced pressure in order to obtain all the formed adiponitrile as technically pure product. The residue may be at least in part recycled as diluent. However, it is preferable to subject at least a portion of it to a quick distillation under high vacuum, in order to obtain a distillate to be used as diluent, and a residue practically free from useful products.

A particularly advantageous method consists in using a considerable part of the heat supplied, in the process, for producing, directly, technically pure adiponitrile and diluent free from non-volatile by-products and catalyst. This result is attained by separating the two phases which leave the reactor and feeding the gaseous phase to the bottom of a column having suitable resolving power. Ammonia, water and volatile by-products are drawn off from the head; technically pure adiponitrile from an intermediate plate; and a fraction containing adiponitrile and intermediate products free from non-volatile by-products and catalyst from the bottom. This last fraction can be used directly as diluent and for dissolving adipic acid starting material or, more simply, it can be recycled to the reactor. Therefore, in this instance, the reactor acts also as a boiler for the rectifying column.

The foregoing method is particularly advantageous, because technically pure adiponitrile and diluent is obtained without resort to a separate system such as distillation under reduced pressure, requiring considerable cost and losses in yield due to alterations in the product. The method, furthermore, allows realization in an almost automatic manner of dosage and circulation of diluent.

Operation according to the improved method of our invention, circulation of diluent in a closed cycle is obtained and the main reaction products are recovered from the process in total amounts corresponding almost to the amount of adipic acid used. The main reaction products consist of technically pure adiponitrile and liquid phase of the reaction which, as mentioned above, consists of adiponitrile, intermediate products, non-volatile by-products and catalyst.

By recovering the useful products from the liquid phase of the reaction and by recycling them, it is possible, in practice, as technically pure product, directly from the column. To recover useful products from the liquid phase of the reaction, it is possible for instance to utilize a quick distillation under a high vacuum; or more advantageously, an exhaust treatment according to the process described in our copending application, Serial No. 343,451, filed concuurrently herewith, based on the Italian application No. 3,532/63, filed in Italy, February 20, 1963. The process of that application can be also advantageously used for treating all or a portion of the product that leaves the reactor.

Using the method, according to our above-mentioned copending application, the process is realized in its most improved embodiment. This is accomplished by sending the liquid phase which leaves the reactor into the evaporator, as described, wherein, under an ammonia stream, all the useful products are stripped off and preferably sent to the reactor together with the ammonia, directly in the gaseous state. Therefore, from an intermediate plate of the column, all the adiponitrile formed in the process is drawn off, while from the bottom of the evaporator a residue is discharged, practically free from useful products. While the recovery method of our copending application is preferred, the instant invention of itself using other recovery methods provides superior results.

The drawing describes an apparatus for carrying out the invention and is further described with respect to Example 9.

The expression "Nl." refers to volume in liters at normal conditions.

The invention will be described further in conjunction with the following specific examples, but these examples are not intended to limit the invention thereto being intended merely for the purposes of illustration.

Example 1, reported below, shows the preparation of adiponitrile in liquid phase in the absence of diluent, in order to present the advantages of the process according to our invention more clearly.

*Example 1*

1 kg. of 100% molten adipic acid, 6 g. of 85% phosphoric acid and 1800 Nl. of gaseous ammonia per hour were continuously fed into the lower part of an 18/8 stainless steel vertical tube. The tube had a 38 mm. diameter, a height of 1145 mm. and was provided with a jacket for the forced circulation of oil heated to 310°–315° C.

The reaction products were sent to the rectification column from the head of which water and excess ammonia were discharged. At the bottom, a dark liquid (790 g.) was discharged, which by distillation under vacuum (1–2 mm. Hg) yielded as distillate 213.3 g. of adiponitrile and as residue a crude consisting of intermediate products, by-products and catalyst.

By further nitrilation of this residue and successive distillation under vacuum (1–2 mm. Hg), in a film evaporator provided with an agitator, an additional 330.4 g. of adiponitrile were obtained. The total yield amounted to 73.5% of theoretical.

This procedure led to very low yields, and had the added inconvenience of not permitting a continuous run for more than 70–80 hours due to considerable fouling on the reactor walls. In addition, there was a substantial reduction of heat exchange. Accordingly, the temperature of the products leaving the reactor decreased gradually during the run from about 280° C. down to 260° C.

Furthermore, the results obtained at the start of the run differed considerably from those at the end. The amounts given in the example represent the average of a run lasting 75 hours.

After about one month of running, the apparatus showed clear evidence of corrosion, owing to the presence of phosphoric acid derivatives that under the conditions described fouled the reactor walls.

Example 2

Using the apparatus described in Example 1, and carrying out of the heating with oil at the same temperature, 7.1 kg. of a solution (180° C.), obtained by dissolving 1 kg. of adipic acid in adiponitrile, 6 g. of 85% phosphoric acid and 1800 Nl. of ammonia were fed in continuously every hour. Working as described in the preceding example, 6860 g./h. of product were discharged from the base of the rectification column, which on distillation under vacuum (1–2 mm. Hg) gave as distillate 6480 g./h. of adiponitrile and a crude residue consisting of intermediates, by-products and catalyst. A part of the adiponitrile produced thereby (6.1 kg./h.) was used for the dissolution of adipic acid and was introduced into the reactor as mentioned above. Upon further nitrilation of the residue and successive distillation under vacuum (1–2 mm. Hg), in a film evaporator provided with agitator, 249.9 g. more of adiponitrile were obtained. The total yield was 85.1% of theoretical.

The use of solvent made possible carrying out a continuous process, because only after a few months was a measurable thickness of fouling noted on the reactor walls.

The temperature of the products leaving the reactor at the start was 280° C., and decreased only very slowly in time, in contrast to the preceding example. In addition, the yields given in the example remained practically constant. After many months of running (about 30) the reactor did not show any trace of corrosion.

Example 3

Working in the manner as described in Example 2, 23 g./h. of an aqueous solution of 30% diammonium phosphate were introduced into the reactor as catalyst, instead of phosphoric acid. 629 g./h. of adiponitrile corresponding to a yield of 85% were obtained.

Example 4

A run was carried out under the same conditions of Example 2, but using a smaller amount of catalyst (0.2 g./h. of 85% phosphoric acid corresponding to 0.017% with respect to adipic acid). The reaction did not occur regularly; the heat absorption was clearly lower than normal; by-products were formed in higher amount, as carbon dioxide, cyclopentanone and tarry products, which fouled the reactor walls and hindered the continuous process. Furthermore, the yield of adiponitrile was particularly low.

Example 5

In another run carried out under the same conditions of Example 2, the only change introduced was in the use of a higher amount of catalyst (29 g./h. of 85% phosphoric acid corresponding to 2.5% with respect to adipic acid). The reaction occurred regularly and gave comparable yields. However, because the amount of phosphoric acid was higher than that which could dissolve or be carried by the fluids passing through the reactor from the bottom in an upward flow, an accumulation of phosphoric acid derivatives occurred in many parts of the apparatus. These derivatives had a high viscosity at the reaction temperature and were hard and glass-like when cold, which caused the shut down of the run in a short time.

In several runs carried out according to this example, the ammonia inlet pipe into the reactor clogged, and it was necessary to shut down only after a few days, in order to clear the apparatus.

Example 6

Into the lower part of an 18/8/2 stainless steel vertical tube (diameter 50 mm., height 2120 mm.), heated with Dowtherm vapors condensing at 305° C., and connected with a rectification column as described in Example 1, 3.4 kg./h. of molten adipic acid, 19 g./h. of 75% phosphoric acid, 6.5 Nm.³/h. of ammonia and 13.6 kg./h. of crude reaction product were introduced. The crude from the base of the rectification column consisted, on an average of 60% adiponitrile, 30% omega-cyanovaleramide, 5% adipamide, 5% catalyst and waste products.

After separation in the rectification column of the ammonia in excess and water, the crude reaction product (16.22 kg./h.) was recycled in part to the reactor as diluent, whereas the remainder (2.62 kg./h.) was distilled fractionally under vacuum (1–2 mm. Hg). 1.57 kg./h. of distilled adiponitrile and 1.05 kg./h. of residue were obtained. The residue by nitrilation and successive distillation under vacuum (1–2 mm. Hg) in a film evaporator provided with agitator, gave an additional 0.62 kg./h. of adiponitrile. The total yield was 87%.

By this procedure, operating conditions favorable for carrying out a continuous process of long duration were realized. Particularly, the fouling on the reactor walls was so reduced that cleaning was required only after 2–3 months of running time. There was no trace of corrosion on the apparatus.

Example 7

Into the lower part of a vertical 18/8/2 stainless steel (diameter 50 mm., height 2000 mm.) heated with Dowtherm vapors condensing at 307° C. were introduced, in equicurrent, 2.5 kg./h. of molten adipic acid, 5 g./h. of a solution phosphoric acid at 75%, 5 Nm.³/h. ammonia and 16 kg./h. of diluent comprising adiponitrile and reaction intermediates.

The products, exiting from the reactor at 282° C. entered to a separator wherein separation of the liquid and gaseous phase occurred. The latter was introduced into the lower part of a rectification column. Steam and excess ammonia were removed from the head of the column and from an intermediate plate, 1.188 kg./h. of technically pure adiponitrile (equal to 64.2% over theoretical) were drawn off. From the base, 16 kg./h. of a liquid fraction comprising adiponitrile and reaction intermediates were also drawn off, this fraction being recycled as reaction diluent as mentioned above.

The liquid phase that was discharged from the separator was nitrilated further and successively distilled under vacuum and gave another 0.5 kg./h. of adiponitrile, which added to that to directly drawn from the column gave a total yield of 91.2%.

After 65 days of continuous running, the temperature of the products leaving the reactor decreased from 282° C. to 278° C. and the yield showed only a slight decrease (from 91.2 to 91.0%). The presence of only a negligible amount of fouling on the walls of the reactor was noted, while no trace of corrosion was found on the apparatus.

Example 8

Into the base of a tubular vertical 18/8/2 stainless steel reactor (diameter 53 mm., height 4000 mm.) heated with Dowtherm vapors condensing at 315° C., were introduced 8.7 Nm.³/h. of ammonia, 6.36 kg./h. of adipic acid containing phosphoric acid in amount equal to 0.1%, and 12 kg./h. of diluent comprising adiponitrile and intermediate reaction products.

The reaction products leaving the reactor at 285° C. were introduced into a separator wherein they separated into two phases, gaseous and liquid.

The gaseous phase entered into the lower part of a rectification column. Steam and excess ammonia were removed from the head of the column. From an intermediate plate, 3.530 kg./h. of technically pure adiponitrile (equal to 75% on the theoretical value), were drawn, and from the base 12 kg./h. of a liquid fraction (35% adiponitrile, 50% omega-cyanovaleramide, 15% consisting of adipamide, omega-cyanovaleric acid, etc.) were drawn which was used as reaction diluent.

The liquid phase coming out of the separator, gave by further nitrilation and successive distillation under vacuum 0.8 kg./h. of adiponitrile, which added to that above gave a 92% yield of technically pure product.

Under the continuous running conditions hereinbefore described, the formation of fouling on the walls of the reactor was very low and no corrosion was found in the apparatus.

*Example 9*

The test in this example was carried out in an apparatus shown in the accompanying drawing: 1-reactor, 2-separator; 3-rectification column, 4-condenser; 5-evaporator.

Into the base 18/8/2 stainless steel reactor 1 (diameter 52 mm.; height 2000 mm.) heated with Dowtherm vapors condensing at 307° C., were introduced 7.5 g./h. of phosphoric acid dissolved in 3.33 kg./h. of molten adipic acid, 4.3 Nm.$^3$/h. of ammonia, 20 kg./h. of diluent (coming from the base of the rectification column and consisting of about 35% adiponitrile and 65% of the intermediate products of the reaction) and the vapors coming from evaporator 5.

The products leaving the head of the reactor at 278° C., were separated in separator 2 into two fractions: a gaseous fraction which was introduced into the lower part of the rectification column 3, and a liquid fraction, which was sent to a thin film evaporator 5 (diameter 50 mm., height 400 mm.), provided with agitator (1500 r.p.m.) and heated by means of Dowtherm vapors condensing at a temperature of 330° C.

In the lower part of the evaporator, 2.3 Nm.$^3$/h. of ammonia were sent. From the base, 0.15 kg./h. of residues, consisting of catalyst, and non-volatile by-products that are practically free of useful products, were discharged. The vapors, leaving the head of the reactor at 273° C., were sent to the lower part of the reactor. From the upper part of the rectification column steam and excess ammonia were removed, which were cooled in condenser 4. One portion of the water was refluxed into the column maintaining a temperature (80–90° C.) at the head of the column, that hinders loss of adiponitrile.

From an intermediate plate 2.262 kg./h. of technically pure adiponitrile, equal to a yield of 91.7%, were drawn off. From the base of the rectification column, 20 kg./h. of fraction were extracted and recycled to the base of the reactor as diluent.

After 52 days of continuous running, the temperature of the products leaving the reactor was 275° C. and the yield of the last 7 days run was 91.5% (compared to 91.7% obtained in the first 30 days).

The operation was interrupted purposedly after 52 days and inspection of the apparatus showed no corrosion of the metal and the existence of a very thin layer of fouling on the reactor walls, which did not affect the process to any extent.

*Example 10*

This example is carried out according to the conditions described in the preceding example with the exception that adipic acid, catalyst, ammonia and diluent are admixed, before being fed into the reactor, in a pre-reactor (diameter 100 mm., height 500 mm.) kept at 240° C. This premixing resulted in 2.292 kg./h. of technically pure adiponitrile, equivalent to a 93% yield, being drawn off from the intermediate plate of the rectification column.

We claim:

1. A process for producing adiponitrile which comprises continuously contacting, in liquid phase, adipic acid, an excess of 5–14 mols gaseous ammonia per 1 mol adipic acid, and a catalyst soluble in the reaction medium at a temperature between 255° C. and 320° C. in the presence of a diluent selected from the group consisting of adiponitrile, the intermediate products of the reaction of adipic acid and ammonia and mixtures thereof, to yield a reaction product comprising two phases, a gaseous phase and a liquid phase, continuously introducing said gaseous phase into a rectification column, and drawing water, excess ammonia and volatile by-products from the head of said column, drawing adiponitrile of at least 98% purity from an intermediate point of the column and drawing a fraction comprising adiponitrile and reaction intermediates from the base of said column and recycling the latter fraction, free from both catalyst and tarry by-products as the diluent to the process.

2. A process according to claim 1, wherein, of the two phases which form the reaction product, the liquid phase is subjected to a stripping for the separation of catalyst and tarry by-products to recover adiponitrile and the intermediate products of the reaction of adipic acid and ammonia and mixtures thereof, a portion of which are recycled to the process.

3. A process according to claim 1, wherein the initial contact of reactants is at a temperature lower than the reactor, of about 220° to 255° C., in the presence of the diluent.

4. A process according to claim 1, in which the diluent is used in a ratio to reacted adipic acid of 0.3 to 8 parts by weight.

5. A process according to claim 1, wherein the catalyst is selected from the group consisting of phosphoric acid, diammonium phosphate, phosphoric acid esters and phosphoric acid derivatives soluble in the reaction medium.

6. A process for producing adiponitrile by reaction, in liquid phase, of adipic acid, gaseous ammonia and catalyst, which comprises continuously contacting adipic acid, gaseous ammonia in excess and a phosphoric acid catalyst, at temperatures between 240° and 320° C., in the presence of a diluent selected from the group consisting of adiponitrile, intermediate products of the reaction of adipic acid and ammonia and mixtures thereof in a ratio of 0.3 to 8 of diluent to reacted adipic acid, the catalyst being between 0.02 and 2% by weight of reacted adipic acid, the ammonia being in excess of between 5 and 14 moles per mole of adipic acid, the flow rate of adipic acid of between 0.1 and 2 kg./h. per liter of reaction space, and the flow-rate of ammonia of between 50 and 800 Nl./h.cm.$^2$ of the reactor section.

7. The process of claim 6 wherein the initial contact of reactants is at a temperature between 220° and 255° C. in the presence of a diluent and subsequently bringing the reactants and diluent to reaction temperature.

References Cited by the Examiner
UNITED STATES PATENTS

| | | | |
|---|---|---|---|
| 2,132,849 | 10/1938 | Greenewalt et al. | 260—465.2 |
| 2,273,633 | 2/1942 | Fluchaire et al. | 260—465.2 |
| 3,217,027 | 11/1965 | Little | 260—465.2 X |

CHARLES B. PARKER, *Primary Examiner.*

JOSEPH P. BRUST, *Examiner.*